US006708949B2

(12) United States Patent
Twito

(10) Patent No.: US 6,708,949 B2
(45) Date of Patent: Mar. 23, 2004

(54) SPLIT DAMPER HOUSING

(75) Inventor: Israel Twito, Herzelia (IL)

(73) Assignee: Twitoplast, LTD, Petach Tikva (IL)

( * ) Notice: Subject to any disclaimer, the term of this patent is extended or adjusted under 35 U.S.C. 154(b) by 0 days.

(21) Appl. No.: 09/863,420

(22) Filed: May 24, 2001

(65) Prior Publication Data

US 2002/0030172 A1 Mar. 14, 2002

(30) Foreign Application Priority Data

May 25, 2000 (IL) ................................................ 136370

(51) Int. Cl.[7] .................................................. F16K 1/22

(52) U.S. Cl. ....................................... 251/305; 251/367

(58) Field of Search ................................. 251/305, 367

(56) References Cited

U.S. PATENT DOCUMENTS

| | | | | | |
|---|---|---|---|---|---|
| 3,737,144 | A | * | 6/1973 | Duncan | 251/307 |
| 4,200,258 | A | * | 4/1980 | Gliatas | 251/214 |
| 4,653,725 | A | * | 3/1987 | Nanz et al. | 251/301 |
| 5,236,003 | A | * | 8/1993 | Habicht | 137/315 |
| 5,360,030 | A | * | 11/1994 | Sisk | 137/375 |
| 5,482,252 | A | * | 1/1996 | Kamezawa | 251/305 |
| 5,603,484 | A | * | 2/1997 | Dole et al. | 251/148 |
| 5,857,617 | A | * | 1/1999 | Weng | 236/49.3 |
| 5,865,210 | A | * | 2/1999 | Fort et al. | 137/315 |
| 5,988,131 | A | * | 11/1999 | Hernandez et al. | 123/184.21 |

* cited by examiner

*Primary Examiner*—John Fox
(74) *Attorney, Agent, or Firm*—Eitan, Pearl, Latzer & Cohen, Zedek, LLP

(57) ABSTRACT

The invention relates to a device for the control of gas flow in air conditioning systmes. The device comprises a two part housing for a damper element. The two parts are identical provided with male and female interconnection elements.

6 Claims, 3 Drawing Sheets

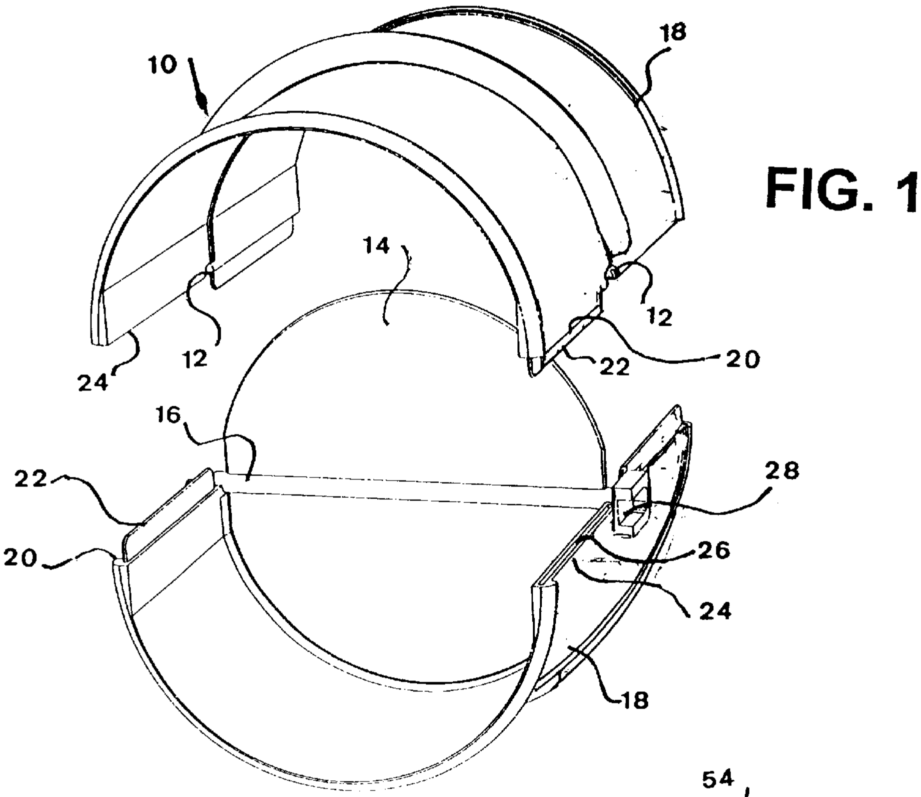
FIG. 1
FIG. 2
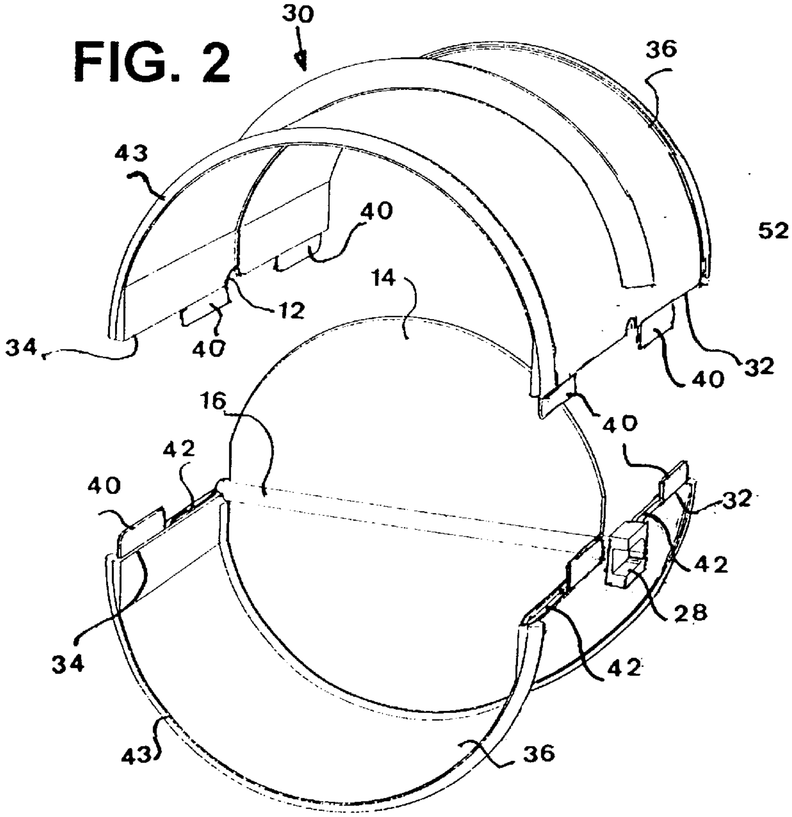
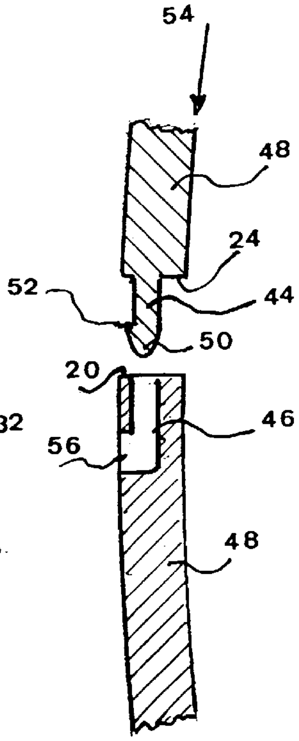
FIG. 3

SPLIT DAMPER HOUSING

FIELD AND BACKGROUND OF THE INVENTION

The present invention relates to the control of gas flow.

More particularly, the invention provides a two-part housing for a damper element, typically useful in air-conditioning ducts, the design of the housing providing manufacturing and installation advantages.

Gas flow in furnace chimneys, cooking and water heating appliances used in food preparation, in ventilation vents and air conditioning ducts often require some form of flow control. A simple baffle plate, hinged about its mid point, has been found to operate satisfactorily in most applications. The baffle plate may be controlled by had, be electrically operated but manually controlled, or control and operation can be completely automatic.

Where the baffle plate housing is small it can conveniently be made in one piece, as can be seen for example in the "HONEYWELL" automatic furnace vent damper. This unit is intended to reduce room heat losses when the gas furnace is off. The damper has an aluminum cast housing, is available to fit flue diameters between 4" to 6" and has a 5 watt motor automatically actuated, In air conditioning systems ducts are typically larger, and a die to manufacture a complete housing would be large, complex and expensive relative to the number of units being produced.

Current practice is to construct dampers using two flange-like metal housings which are riveted together. The installation technician needs to take this bulky unit to the site where work is to be carried out. Manufacturing costs for the housing are high.

In many countries intense competition prevails between manufacturers, and also between installers of air conditioning systems, wherefore any possible cost reduction of a major component can provide a significant advantage.

In U.S. Pat. No. 4,175,593 Sack discloses plastic cable ducting wherein the duct wall is slit along the length thereof. Opposed to the slit, the wall is weakened to form an integral hinge. The dusting is used to cover an existing laid cable. The duct thus forms a hollow cylinder which has a complete lengthwise split. While the Sack patent is unconnected to air ducts, the principle of axial splitting, as opposed to splitting in a perpendicular direction is demonstrated as an economic method of providing access to the inside of a conduit.

OBJECTS OF THE INVENTION

It is therefore one of the objects of the present invention to obviate the disadvantages of prior art gas duct damper housings and to provide a housing split lengthwise, parallel to its axis, which housing can be manufactured without including high die costs.

It is a further object of the present invention to provide a housing which can form a compact package before assembly, and which can be easily and quickly assembled on site without the use of tools.

SUMMARY OF THE INVENTION

The present invention achieves the above objects by providing a plastic damper housing for a gas duct particularly useful in air conditioning systems, said housing providing support bearings for damper plate hinge shafts, and comprising an assembly of two identical moldings each shaped substantially as an open-ended half hollow cylinder, each half hollow cylinder being provided along a first axial edge with at least one male interconnection element and on a second opposite edge with at least one corresponding female interconnection element.

In a preferred embodiment of the present invention there is provided a plastic damper housing wherein each said half hollow cylinder is further provided with a guide and retention element for supporting therein a base-plate of an actuating device.

In a most preferred embodiment of the present invention there is provided a motor-powered gas damper for use in combination with an air-conditioning system, said damper being located inside a split plastic damper housing as described above.

Yet further embodiments of the invention will be described hereinafter.

It is well known that in plastic molding, dies to manufacture large components become more expensive than similar dies for a small component, the cost increase and weight increase of the die being more than proportional to size of the molding to be produced therefrom. This results from the need to increase all three dimensions of the die to mold the larger component.

The economics of tooling is also dependent on the number of items to be processed. Thus with regard to plastic castings, a larger number of smaller moldings is far preferable to a smaller number of larger moldings.

By careful design, and by retaining symmetry about the half-length of the component, it has been found possible to produce a half-housing, including rail supports for an electric drive unit, that can be assembled to an identical half-housing when rotated 180 degrees relative to the first unit. This has been achieved even for embodiments provided with a motor support rail on one side.

During storage and transport to the installation site the two half-housings nest together and form a reasonably compact package.

Interconnection of the two half-housings, including the damper element held therebetween can be effected on site without the use of any tool. Time required is about 20 seconds.

DESCRIPTION OF DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the Drawings:

FIG. 1 is a perspective view of a preferred embodiment of the housing according to the invention, shown before final assembly;

FIG. 2 is a perspective view of a similar housing, provided with multiple interconnection elements;

FIG. 3 is a detail view of a joint between the two half-housings which resists inadvertent disassembly;

FULL DISCLOSURE OF INVENTION

Figure 4:
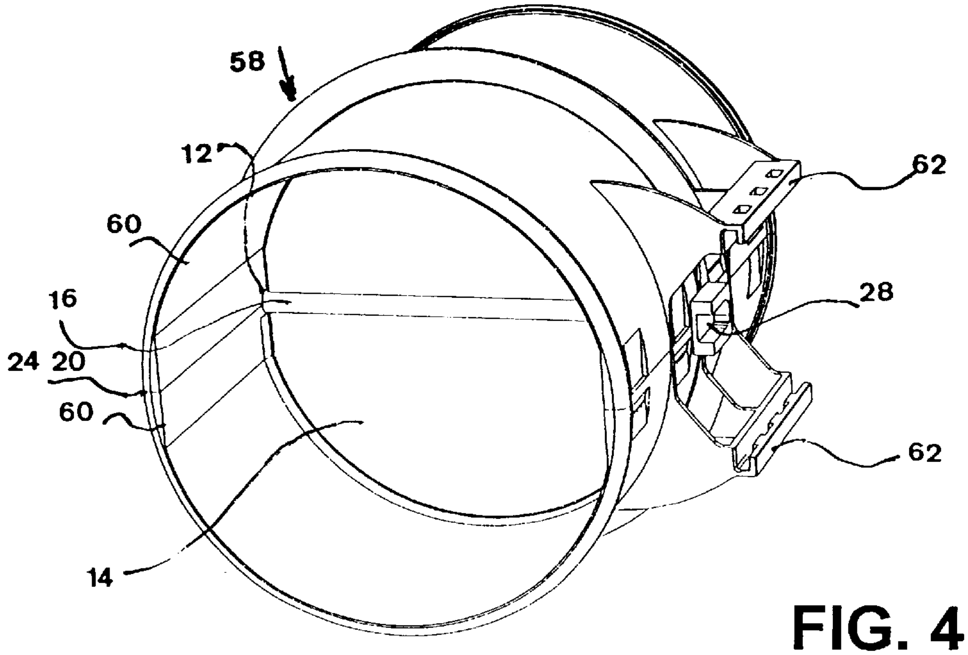
FIG. 4 is a perspective view of an assembled embodiment provided with motor support rails.

There is seen in FIG. 1 a plastic damper housing 10 for a gas duct which is particularly useful in air conditioning systems.

The housing 10 provides support bearings 12 for the ends of the damper plate 14 hinge shaft 16. Bearings 12 allow tilting the damper plate 14 from fully closed as shown, to fully open when the damper plate is horizontal.

The housing 10 comprises an assembly of two identical plastic moldings each shaped substantially as an open-ended half hollow cylinder 18. Each half hollow cylinder 18 supports along a first axial edge 20 a male interconnection element 22. The second opposite edge 24 has a corresponding female interconnection element 26. The half-cylinder 18 in the present embodiment, and all further embodiments, is symmetrical in so far as it can be rotated 180 degrees about a vertical central axis after which the interconnection elements 22, 26 are again suitably oriented for assembly of the two halves 18.

Before assembly, and for purposes of storage and transport, the half hollow cylinders 18 can be stacked one substantially inside the other to make a compact package.

The two halves 18 are assembled simply by resting the damper plate 14 in the lower half 18 with its hinge shaft 16 being revolvably supported in the bearings 12. The two cylinder halves 18 can then be pressed together.

In the present embodiment the damper plate may be hand operated by connecting an appropriate mechanism to the shaft head 28.

With reference to the rest of the figures, similar reference numerals have been used to identify similar parts.

Referring now to FIG. 2, there is seen a plastic damper housing 30 similar to 10 seen in FIG. 1. However each axial edge 32, 34 of the half hollow cylinder 36 is provided with two pairs of in-line male 40 and female 42 interconnection elements separated by half of bearing 12 for the damper plate hinge shaft 16. Thus each axial edge 32, 34 carries four interconnection elements 40, 42, only two of which are visible in the figure.

A male element 40 is proximate to a first end 43 of the half hollow cylinder 36 on a first axial edge 32. A female element 42 on the second opposite axial edge 34 is also proximate to end 42. The interconnecting elements 40, 42 are positioned to maintain the symmetry stated with regard to FIG. 1. Thus on assembly a total of eight male/female element pairs interconnect to form the complete housing 30, FIG. 3 illustrates a detail of interconnecting elements 44, 46. The plastic damper half-housing 48 carries at least one male interconnection element 44 wherein the outer extremity thereof 50 has a step projection 52.

The corresponding female interconnection element 46 is provided with a side aperture 56 allowing the step projection 52 to snap therein on assembly for producing a housing 54 secured against inadvertent disassembly.

Figure 5:
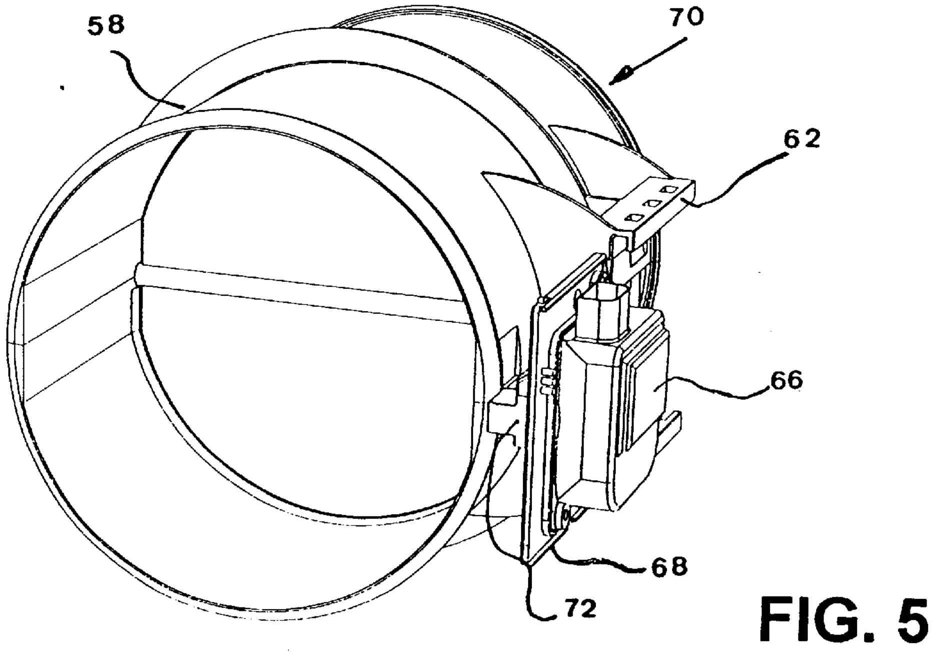
FIG. 5 is a perspective view of a motor-powered gas damper, the motor being shown not yet inserted in its rails.

Seen in FIG. 4 is a plastic damper housing 58 suitable for supporting an electric motor (66 seen in FIG. 5).

Each half hollow cylinder 60 is provided with a guide and retention element 62 which forms one of two supporting rails for the base-plate 68 of the motor.

At first sight it would appear that two dies (left hand, right hand) would be required to make the upper and lower half cylinder. However due to symmetry a pair of identical half-cylinder moldings 60 emanating from a single die can be and are used to form the housing 58.

Referring now to FIG. 5, there is depicted a motor-powered gas damper 70 for use in combination with an air-conditioning system. For illustrative purposes the motor 66 is shown adjacent to but not yet inserted into retention element 62. The motor includes a speed reducer (not seen). A projecting drive tongue 72 will engage the damper shaft head 28 when the motor 66 is in its intended position.

The gas damper housing is the split housing 58 seen in FIG. 4.

Figure 6:
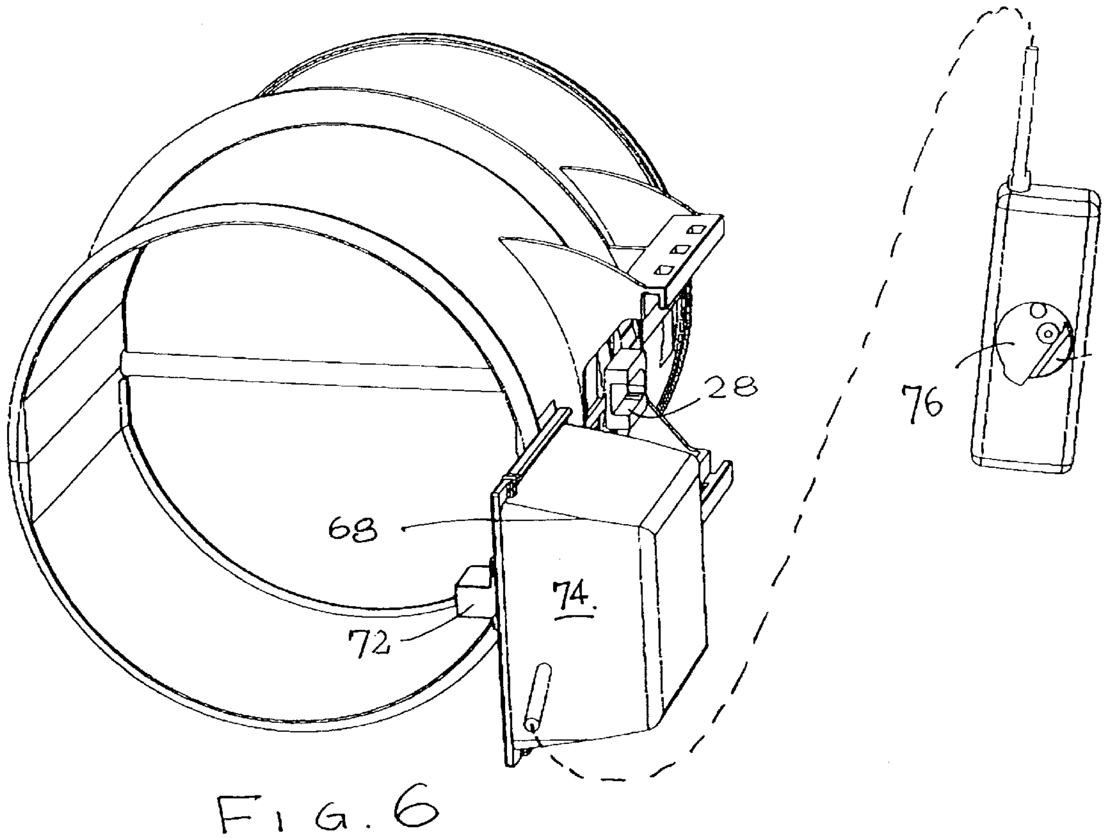
FIG. 6 is a perspective view of the housing with a manual actuator.

FIG. 6 illustrates a further embodiment where on base-plate 68 Mere is mounted a manual mechanism 74 which is operated by knob 76. The turning of knob 76 clockwise or anti-clockwise pivots damper plate 14.

The scope of the described invention is intended to include all embodiments coming within the meaning of the following claims. The foregoing examples illustrate useful forms of the invention, but are not to be considered as limiting its scope, as those skilled in the art will readily be aware that additional variants and modifications of the invention can be formulated without departing from the meaning of the following claims.

What is claimed is:

1. A plastic damper housing for a gas duct particularly useful in air conditioning systems, said housing providing support bearings for damper plate hinge shafts, and comprising an assembly of two identical moldings each shaped substantially as an open-ended half hollow cylinder, each half hollow cylinder being provided along a first axial edge with at least one male interconnection element and on a second opposite edge with at least one corresponding female interconnection element.

2. The plastic damper housing as claimed in claim 1, wherein each said axial edge of each said half hollow cylinder is provided with at least one pair of in-line male and female interconnection elements separated by a half bearing for a damper plate hinge shaft, said male element being proximate to a first end of said half hollow cylinder on said first axial edge and said female element on said second opposite axial edge also being proximate to said first end.

3. The plastic damper housing as claimed in claim 1, wherein the outer extremity of said male interconnection element is provided with a step projection, and said female interconnection element is provided with a side aperture allowing said step projection to snap therein for producing a housing secured against inadvertent disassembly.

4. The plastic damper housing as claimed in claim 1, wherein each said half hollow cylinder is further provided with a guide and retention element for supporting therein a base-plate of an actuating motor.

5. The plastic damper housing as claimed in claim 1, wherein each said if hollow cylinder is further provided with a guide and retention element for supporting therein a base-plate of a manual operating means.

6. A motor-powered gas damper for use in combination with an air-conditioning system, said damper being located inside a split plastic damper housing as claimed in claim 1.

* * * * *